United States Patent [19]

Haught et al.

[11] 4,221,998
[45] Sep. 9, 1980

[54] HIGH ACCURACY CONTROL SYSTEM

[75] Inventors: Thomas P. Haught; Dale F. Johnson, both of Waynesboro, Va.

[73] Assignee: General Electric Company, New York, N.Y.

[21] Appl. No.: 863,106

[22] Filed: Dec. 22, 1977

[51] Int. Cl.² .............................................. G05B 1/06
[52] U.S. Cl. .................... 318/661; 318/608; 318/592; 318/594
[58] Field of Search ............... 318/606, 608, 592, 594, 318/661

[56] References Cited

U.S. PATENT DOCUMENTS

| 3,349,229 | 10/1967 | Evans | 318/661 |
| 3,473,009 | 10/1969 | Gerber et al. | 318/594 |
| 3,657,525 | 4/1972 | Evans | 318/661 |
| 3,798,430 | 3/1974 | Simon et al. | 318/661 |

Primary Examiner—J. V. Truhe
Assistant Examiner—Eugene S. Indyk
Attorney, Agent, or Firm—W. C. Bernkopf

[57] ABSTRACT

A high accuracy control system for driving a motor to move a member. The control system includes feedback means for generating a cyclical signal for providing an indication of the actual position of the member. The accuracy of the feedback means is maximized by introducing a gear mechanism between the motor output and the feedback means. Further provided are means for generating command pulses, each of which is indicative of an increment of commanded or desired movement of the member, and means for generating a command signal indicative of the desired commanded movement of the member. In one mode of operation, the incremental command pulses are multiplied by a factor of K to change the command signal by K increments for each incremental command pulse. In another mode of operation, M number of incremental command pulses are converted to a single incremental pulse, and this single incremental pulse is used to change the command signal by one increment of movement for M number of incremental command pulses. Further provided is means responsive to the signal from the feedback means and to the command signal to generate an error signal which is used to drive the member toward the desired commanded position.

11 Claims, 1 Drawing Figure

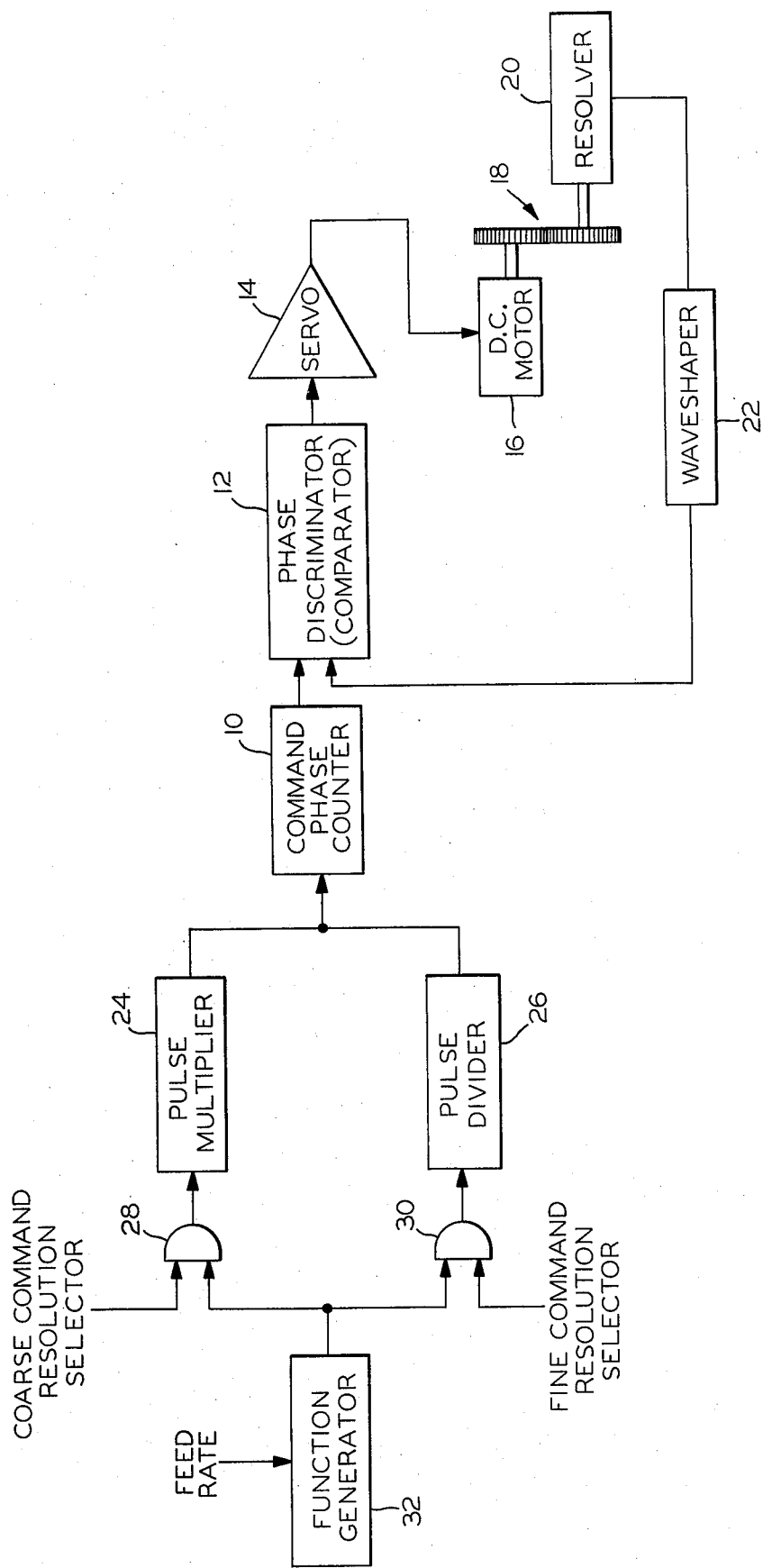

HIGH ACCURACY CONTROL SYSTEM

BACKGROUND OF THE INVENTION

1. Field of the Invention

This invention relates to a control system, and more particularly, to an improved high accuracy numerical control system.

2. Description of the Prior Art

When a machine tool is controlled by a numerical control system, there are applications where it is necessary to control the machine tool to achieve the greatest accuracy possible. In a numerical control system using a resolver feedback, the accuracy of the system is related to the amount of detected movement of the tool or member that will cause a shift in the phase of an electrical output signal from the resolver over one electrical cycle, wherein the phase of the output signal is indicative of the actual position of the member.

In a standard position loop numerical control system, the output signal from the resolver is applied to a waveshaper to produce a square wave feedback signal having cyclical transitions, wherein the period between successive transitions is equal to the previously referred to electrical cycle. This feedback signal is compared with a command signal in a phase discriminator. The command signal is also a square wave signal having cyclical transitions, wherein the phase of these transitions is indicative of the commanded (desired) movement of the member. The difference in phase between the command signal and the feedback signal is detected in the phase discriminator, and the detected error signal is used to drive a servo amplifier and motor to cause the member to move toward the desired position. The period between successive cyclical transitions in the command signal is also equal to the previously referred to electrical cycle. The phase of the electrical cycle defined by successive cyclical transitions in the command signal shifts by receiving incremental command pulses, wherein one thousand command pulses cause the phase of the command signal to shift by one electrical cycle. Thus, if the shift in phase of the output signal from the waveshaper through one electrical cycle would represent 0.1" in movement of the member, then the shift in phase of the command signal through one electrical cycle would represent 0.1" in desired movement of the member, and each incremental command pulse represents 0.0001" in commanded movement. This 0.0001" is the smallest increment in commanded movement and is referred to as the command resolution of the system.

To increase the system accuracy and also the fineness of the command resolution of the system, it would be necessary to increase the sensitivity of the resolver by providing that the movement of the member, which is necessary to cause the output signal from the resolver to shift one electrical cycle, is smaller. To maximize the accuracy of the system, a gearing mechanism can be interposed between the motor output and the resolver. The ratio of the gearing mechanism would depend upon the maximum speed that the resolver can be driven. Under the current state of the technology, if, for example, the resolver could be driven to its limit, determined by a gear ratio of 5:1, the amount that the member must move to cause the phase of the output of the resolver to shift one electrical cycle would be one-fifth as great as before or 0.02". Thus, each increment of commanded movement (i.e., command resolution) would be equal to 0.00002" or 20 microns. Under these circumstances, the system would achieve a finer resolution and higher accuracy. However, at the same time, in view of the fact that each increment of commanded movement for the system is equal to 0.00002" or 20 microns, the maximum commanded movement and feed or jog rate that the system can achieve may be lower than desired when large amounts of metal removal in the shortest time is most important.

OBJECTS OF THE INVENTION

It is, therefore, an object of this invention to provide a control system which is operating at maximum accuracy, while, at the same time, not adversely affecting the other parameters of the system.

It is another object of the invention to provide a high accuracy numerical control system wherein the amount of detected movement of a member that is necessary to shift the phase of the output signal from a resolver through one electrical cycle is as small as possible, while at the same time, the command resolution of the system can still be maintained at a reasonably high (coarse) value.

These and other objects of the invention will be pointed out hereinafter.

SUMMARY OF THE INVENTION

According to a broad aspect of the invention, there is provided a high accuracy control system for driving a motor to move a member. The control system is comprised of feedback means for generating a first signal having successive cyclical transitions. The phase of each transition is indicative of the actual position of the member, and the period between successive transitions defines an electrical cycle. The actual distance the member must move to cause a shift in the phase of the cyclical transitions by one electrical cycle is a measure of the accuracy of the system. Further provided is means responsive to movement of the member for maximizing the accuracy of the feedback means and the system itself. This is accomplished by dividing by a factor of X the actual distance the member must move to cause a shift in the phase of the cyclical transitions by one electrical cycle. Further provided are means for generating command pulses which are indicative of an increment of commanded movement, and means for generating a command signal indicative of the (desired) commanded movement of the member. The system may be operated in one of two modes. The first mode may be considered a coarse resolution mode, and the second mode may be considered a fine resolution mode. In the coarse resolution mode where it is desired that each incremental command pulse represents the largest commanded movement possible, means is provided for multiplying each incremental command pulse by a factor of K to apply K number of pulses to the command signal generating means, thereby causing the phase of the command signal to change by K increments for each incremental command pulse. When the system is operating in the fine resolution mode, there is provided means for receiving M number of incremental command pulses and transmitting a single incremental pulse in response thereto to the command signal generating means, thereby causing the command signal to change by one increment of movement for M number of incremental command pulses. In addition to the above, the system further provides means responsive to the signal from the feedback means and to the command signal to generate an error signal, and means responsive to the error signal for driving the member toward the desired commanded position.

In accordance with one embodiment of the invention, the maximizing means is a gear mechanism for transmitting X times the amount of movement to the feedback means from the motor output than would otherwise be monitored if the feedback means were directly coupled to the motor output or the member. The feedback means is comprised of a resolver coupled to the maximizing means for generating an output signal, and waveshaping means for changing the output signal from the resolver to a signal having cyclical transitions.

BRIEF DESCRIPTION OF THE DRAWING

FIG. 1 is a block diagram of a high accuracy position loop control system in accordance with this invention.

DESCRIPTION OF THE PREFERRED EMBODIMENTS

Referring to FIG. 1, the invention will now be explained. In accordance with the invention, FIG. 1 shows a phase analog position loop control system comprised of a command phase counter 10, a phase discriminator 12, a servo amplifier 14, a DC motor 16, a gear mechanism 18, a resolver 20 and a waveshaper 22. Command phase counter 10 receives command pulses from either a pulse multiplier 24 or a pulse divider 26 via respective AND gates 28 and 30 and a function generator 32. A velocity or feedrate signal is fed to the function generator from a standard numerical input data source, not shown. The basic operation of the function generator and the position loop servo system comprised of command phase counter 10, phase discriminator 12, servo 14, resolver 20 and waveshaper 22 are more fully described in U.S. Pat. Nos. 3,173,001, 3,519,904 and 3,657,525, all of which are assigned to the same assignee as the assignee of the present invention.

However, to aid in understanding the present invention, the following brief explanation of the above-referred to position loop system will be provided. In response to a programmed feedrate signal, function generator 32 will provide a means for generating command pulses, wherein each command pulse is indicative of an increment of commanded movement. Command phase counter 10 will respond to these incremental command pulses in a manner to be more fully described later to provide a means for generating a square wave command signal having cyclical transitions, wherein each cyclical transition is indicative of the desired commanded position of the member. The period between successive cyclical transitions defines an electrical cycle, wherein one thousand pulses received by command phase counter 10 will cause a shift in the phase of the command signal by one electrical cycle. DC motor 16, which drives a member such as a machine tool, not shown, has (in prior systems) its output directly coupled to resolver 20. The output signal from resolver 20 is fed to waveshaper 22. The resolver and waveshaper provide a feedback means for generating a square wave feedback signal having successive cyclical transitions, wherein the phase of each transition is indicative of the actual position of the member. The period between successive transitions define an electrical cycle which is identical to the electrical cycle of the command signal. The actual distance the member must move to cause a shift in the phase of the cyclical transitions of the feedback signal by one electrical cycle is a measure of the accuracy of the system. Phase discriminator (comparator) 12 receives the respective command signal from command phase counter 10 and the feedback signal from waveshaper 22, and produces a position error signal which is indicative of the difference between the actual and commanded positions of the member. In other words, phase discriminator 12 provides a means responsive to the command signal and to the feedback signal to generate an error signal. The output error signal from phase discriminator 12 drives servo amplifier 14, which amplifier provides a means responsive to the error signal for further driving the machine member toward the desired commanded position.

In a standard phase analog position loop servo system, resolver 20 would be directly coupled to the output of motor 16. By way of example, one lead screw turn resulting from movement of the motor output, which would normally track 0.2" in movement of a member being controlled, would result in one mechanical turn in resolver 20. One mechanical turn of the resolver results in two electrical cycles. Thus, the phase of the output of waveshaper 22 would shift through one electrical cycle in response to 0.1" in actual movement of the machine tool member being controlled. Under these circumstances, the positioning accuracy of the system equals 0.1" per electrical cycle. Inasmuch as the phase of the command signal would shift one electrical cycle if it were to receive one thousand command pulses directly from the function generator, the command resolution of the system would effectively be equal to 0.0001" per command pulse.

Thus, in order to improve the accuracy of the position loop servo system, it would be necessary to provide a means responsive to movement of the member being controlled by motor 16 for maximizing the accuracy of the feedback means by dividing by a factor of X the actual distance the machine member must move to cause a shift in the phase of the cyclical transitions by one electrical cycle. In this instance, the maximizing means is provided by gear mechanism 18, interposed between the motor output and the resolver, which transmits X times the amount of movement to the resolver than would otherwise be monitored by the resolver if the resolver were directly coupled to the member or the motor output. Thus, in this instance, if X (gear ratio) equals 5, the movement of the member equivalent to 0.2" would result in five mechanical turns of the resolver through ten electrical cycles. Therefore, the shift in phase of the feedback signal from the output of waveshaper 22 through one electrical cycle now represents 0.02" in movement of the member, and the accuracy of the position loop system has thereby been increased by the factor X or five. Inasmuch as the shift in phase of either the command signal or the feedback signal through one electrical cycle is now equivalent to 0.02" in movement, and the command signal shifts through one electrical cycle in one thousand increments, each pulse received by command phase counter 10, which results in an incremental phase shift of the command signal, is equivalent to 0.00002" or 20 microns in commanded movement, and the command resolution of the system is defined as equal to 20 microns.

If, in fact, it would be desirable to operate the phase analog position loop system in a mode of fine command resolution equal to 20 microns, and it were also desirable to program the numerical control system in decimal units where the smallest unit programmable is the unit one, a fine command resolution selector signal would be applied to AND gate 30 from a standard numerical input source such as a tape input or a Manual Data Input (MDI) as selected by an operator. This will enable incremental command pulses produced by function generator 32 to be applied to pulse divider 26. Pulse divider 26 then provides a means selectable by an operator for receiving M number of command pulses and transmitting a single incremental pulse in response thereto to command phase counter 10 for shifting the phase of the command signal by one increment of movement for M number of command pulses. Command phase counter 10 is thereby responsive to M number of command pulses for shifting the phase of the cyclical transitions of the command signal by a predetermined amount, wherein N number of command pulses will shift the phase of the cyclical transitions one complete electrical cycle, and M number of command pulses is indicative of the smallest amount of incremental movement selectable by an operator. Thus, if M were equal to 2, two command pulses, which are generated by function generator 32, will result in one pulse increment being applied to command phase counter 10, and N would be equal to two thousand as the number of incremental command pulses that will cause the phase of the command signal to shift one complete electrical cycle. The command resolution of the system is thereby determined by the two command pulses for commanding a movement of 20 microns, which movement is the smallest incremental amount selectable by the operator. However, if there were only one command pulse produced by function generator 32, no pulse would be received by command phase counter 10, and no movement would be commanded. The single pulse would be stored in pulse divider 26 to await the receiving of a second command pulse before a pulse increment would be transmitted to the command phase counter.

If it were desired to maintain the same position loop accuracy of 0.02" in movement per electrical cycle, while a coarse command resolution is maintained to increase the incremental value of the feed and jog rate to facilitate a faster rate of metal removal, the following adjustment can be made. The operator via a manual data input or a tape input source will cause the generation of a coarse command resolution selector signal which is applied to and enables AND gate 28. This AND gate then allows incremental command pulses from function generator 32 to be applied to multiplier 24. Multiplier 24 provides a means selectable by an operator for multiplying each incremental command pulse by a factor of K to apply K number of pulses to command phase counter 10 so as to shift the phase of the command signal by K increments for each incremental command pulse generated by function generator 32. The command phase counter would thereby be responsive to each incremental command pulse for shifting the phase of the cylical transitions of the command signal by a predetermined amount, wherein N number of incremental command pulses will cause the phase of the command signal to shift one complete electrical cycle, and each command pulse would thereby be indicative of the smallest amount of incremental movement selectable by an operator. Thus, if K were equal to 5, one incremental command pulse would result in five pulse increments being received by the command phase counter. Inasmuch as each pulse increment received at the command phase counter still results in a commanded movement of 0.00002", five pulse increments resulting from the generation of one incremental command pulse from function generator 32 causes 0.0001" in commanded movement, which movement defines the minimum commanded movement or command resolution of the system. The N number of command pulses required to shift the phase of the command signal through one electrical cycle would thus be equal to two hundred when K equals 5. When K equals 5, K also equals X, and the system would then be operating at the same command resolution that it would be operating if the resolver were directly coupled to the output of the DC motor, and the output of the function generator were directly applied to the command phase counter.

While the invention has been described with reference to a standard phase analog position loop control system, it could also be applied to other control systems, such as a digital control system of the type described in U.S. Pat. No. 4,023,085, and assigned to the same assignee as the assignee of the present invention. In U.S. Pat. No. 4,023,085, the phase analog feedback signal is digitized, but the accuracy of the control system could still be established by similarly interposing gear mechanism 18 between the motor output and the resolver. Furthermore, the pulse multiplier and pulse divider could be selectably inserted in such a digital servo system between a means for generating incremental command pulses and a means for generating a command signal, which command signal would then be compared with the digitized feedback signal to produce an error signal to drive the servo amplifier.

Although this invention has been described with reference to a specific embodiment thereof, numerous modifications are possible without departing from the invention, and it is desirable to cover all modifications falling within the spirit and scope of this invention.

What we claim as new and desire to secure by Letters Patent of the United States is:

1. A high accuracy position loop control system for driving a motor to move a member, comprising:
  (a) feedback means for generating a first signal having successive cyclical transitions, the phase of each transition being indicative of the actual position of the member, the period between successive transitions defining an electrical cycle, and the actual distance the member must move to cause a shift in the phase of the cyclical transitions by one electrical cycle being a measure of the accuracy of the system;
  (b) means responsive to movement of the member for maximizing the accuracy of said feedback means by dividing by a factor of X the actual distance the member must move to cause a shift in the phase of the cyclical transitions by one electrical cycle;
  (c) means for generating command pulses, each command pulse being indicative of an increment of commanded movement;
  (d) means for generating a command signal having cyclical transitions, each cyclical transition being indicative of the desired commanded movement of the member, the period between successive cyclical transitions defining the same electrical cycle as that produced by said first signal from said feedback means;
  (e) means selectable by an operator for multiplying each incremental command pulse by a factor of K to apply K number of pulses to said command signal generating means so as to shift the phase of said command signal by K increments for each incremental command pulse, said command signal generating means being thereby responsive to each incremental command pulse for shifting the phase of the cyclical transitions of said command signal by a predetermined amount, wherein N number of incremental command pulses will cause the phase of said command signal to shift one complete electrical cycle, and each command pulse being indicative of the smallest amount of incremental movement selectable by an operator;

(f) means responsive to said first signal from said feedback means and to said command signal to generate an error signal; and (g) means responsive to said error signal for driving the member toward the desired commanded position.

2. A high accuracy position loop control system according to claim 1, wherein said maximizing means is a gear mechanism for transmitting X times the amount of movement to said feedback means than would otherwise be monitored if said feedback means were directly coupled to the member.

3. A high accuracy position loop control system according to claim 2, wherein said feedback means is comprised of:

(a) a resolver, coupled to said maximizing means, for generating an output signal; and (b) waveshaping means for changing the output signal from said resolver to said first signal having cyclical transitions.

4. A high accuracy position loop control system according to claim 1, wherein K is equal to X.

5. A high accuracy position loop control system for driving a motor to move a member, comprising:

(a) feedback means for generating a first signal having successive cyclical transitions, the phase of each transition being indicative of the actual position of the member, the period between successive transitions defining an electrical cycle, and the actual distance the member must move to cause a shift in the phase of the cyclical transitions by one electrical cycle being a measure of the accuracy of the system;

(b) means responsive to movement of the member for maximizing the accuracy of said feedback means by dividing by a factor of X the actual distance the member must move to cause a shift in the phase of the cyclical transitions by one electrical cycle;

(c) means for generating command pulses, each command pulse being indicative of an increment of commanded movement;

(d) means for generating a command signal having cyclical transitions, the phase of each cyclical transition being indicative of the desired commanded movement of the member, and the period between successive cyclical transitions defining the same electrical cycle as that produced by said first signal from said feedback means;

(e) means selectable by an operator for receiving M number of said command pulses and transmitting a single incremental pulse in response thereto to said command signal generating means for shifting the phase of said command signal by one increment of movement for M number of command pulses, said signal generating means thereby being responsive to M number of command pulses for shifting the phase of the cyclical transitions of said command signal by a predetermined amount, wherein N number of command pulses will cause the phase of said command signal to shift by one complete electrical cycle, and M number of command pulses being indicative of the smallest amount of incremental movement selectable by an operator;

(f) means responsive to said first signal from said feedback means and to said command signal to generate an error signal; and (g) means responsive to said error signal for driving the member toward the desired commanded position.

6. A high accuracy position loop control system according to claim 5, wherein said maximizing means is a gear mechanism for transmitting X times the amount of movement to said feedback means than would otherwise be monitored if said feedback means were directly coupled to the member.

7. A high accuracy position loop control system according to claim 6, wherein said feedback means is comprised of:

(a) a resolver, coupled to said maximizing means, for generating an output signal; and (b) waveshaping means for changing the output signal from said resolver to said first signal having cyclical transitions.

8. A high accuracy control system for driving a motor to move a member comprised of:

(a) feedback means for generating a first signal having successive cyclical transitions, the phase of each transition being indicative of the actual position of the member, the period between successive transitions defining an electrical cycle, and the actual distance the member must move to cause a shift in the phase of the cyclical transitions by one electrical cycle being a measure of the accuracy of the system;

(b) means responsive to movement of the member for maximizing the accuracy of said feedback means by dividing by a factor of X the actual distance the member must move to cause a shift in the phase of the cyclical transitions by one electrical cycle;

(c) means for generating command pulses, each command pulse being indicative of an increment of commanded movement;

(d) means for generating a command signal indicative of the desired commanded movement of the member;

(e) means for multiplying each incremental command pulse by a factor of K to apply K number of pulses to said command signal generating means to cause said command signal to change by K increments for each incremental command pulse;

(f) means responsive to said first signal from said feedback means and to said command signal to generate an error signal; and (g) means responsive to said error signal for driving the member toward the desired commanded position.

9. A high accuracy control system according to claim 8, wherein said maximizing means is a gear mechanism for transmitting X times the amount of movement to said feedback means than would otherwise be monitored if said feedback means were directly coupled to the member.

10. A high accuracy control system for driving a motor to move a member comprised of:

(a) feedback means for generating a first signal having successive cyclical transitions, the phase of each transition being indicative of the actual position of the member, the period between successive transitions defining an electrical cycle, and the actual distance the member must move to cause a shift in the phase of the cyclical transitions by one electrical cycle being a measure of the accuracy of the system;

(b) means responsive to movement of the member for maximizing the accuracy of said feedback means by dividing by a factor of X the actual distance the member must move to cause a shift in the phase of the cyclical transitions by one electrical cycle;

(c) means for generating command pulses, each command pulse being indicative of an increment of commanded movement;

(d) means for generating a command signal indicative of the desired commanded movement of the member;

(e) means for receiving M number of said command pulses and transmitting a single incremental pulse in response thereto to said command signal generating means for causing said command signal to change by one increment of movement for M number of incremental command pulses;

(f) means responsive to said first signal from said feedback means and to said command signal to generate an error signal; and (g) means responsive to said error signal for driving said member toward the desired commanded position.

11. A high accuracy control system according to claim 10, wherein said maximizing means is a gear mechanism for transmitting X times the amount of movement to said feedback means than would otherwise be monitored if said feedback means were directly coupled to the member.

* * * * *